May 8, 1951            L. BROCK            2,552,143
ELECTRIC OVEN
Filed March 24, 1947            6 Sheets-Sheet 1
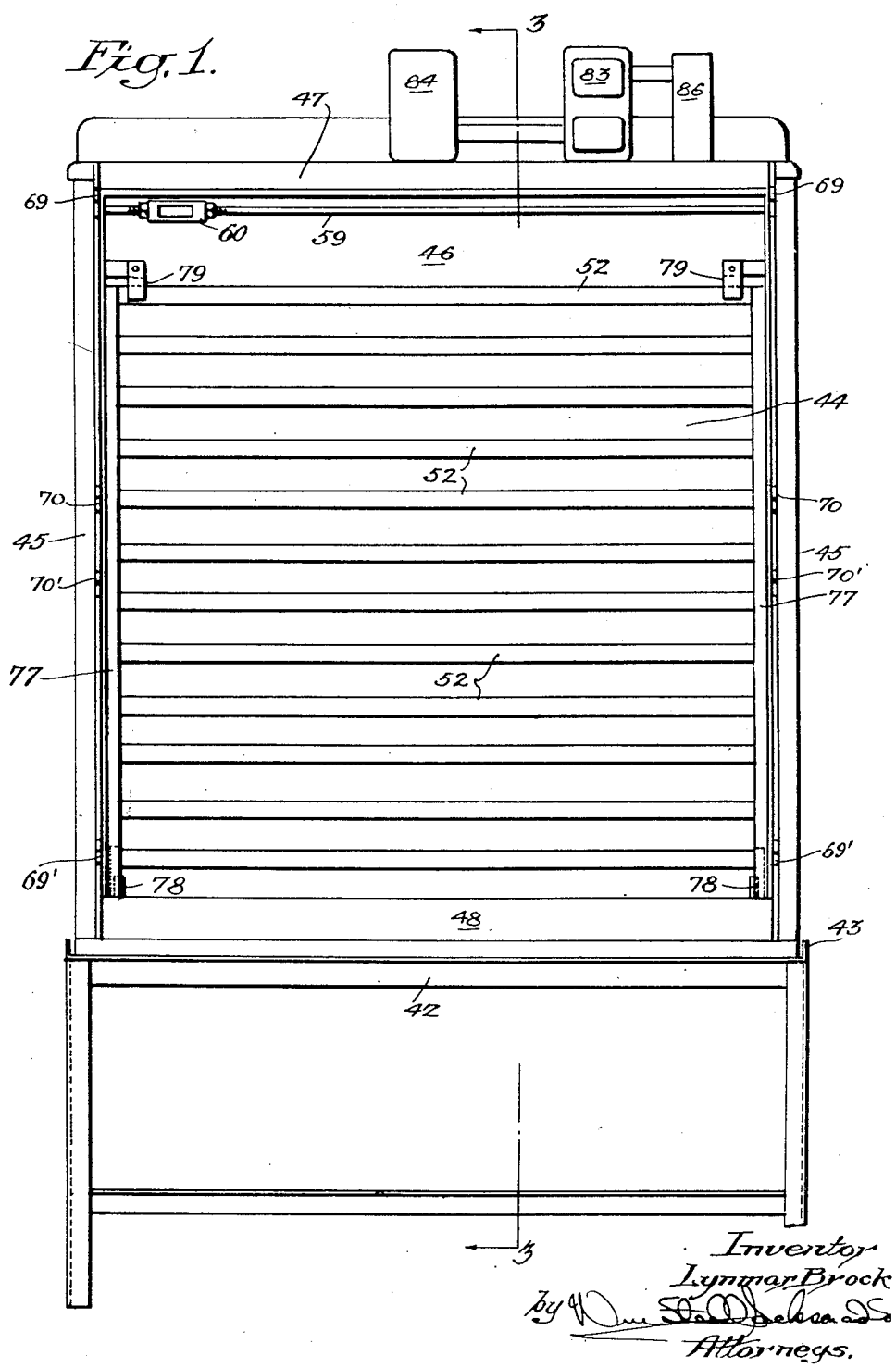

May 8, 1951  L. BROCK  2,552,143
ELECTRIC OVEN
Filed March 24, 1947  6 Sheets-Sheet 2
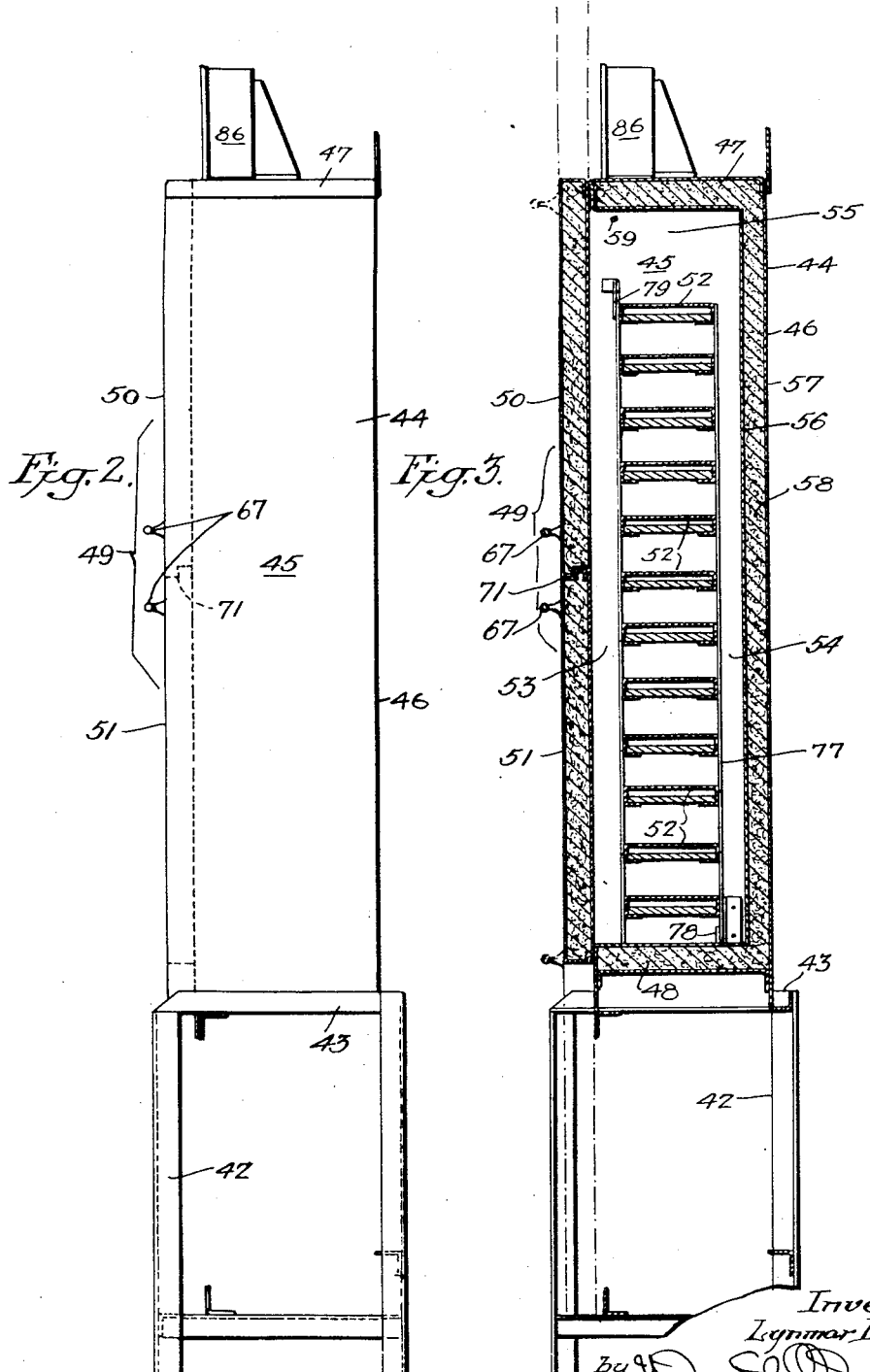

May 8, 1951  L. BROCK  2,552,143
ELECTRIC OVEN
Filed March 24, 1947  6 Sheets-Sheet 3

Inventor
Lynmar Brock
by
Attorneys.

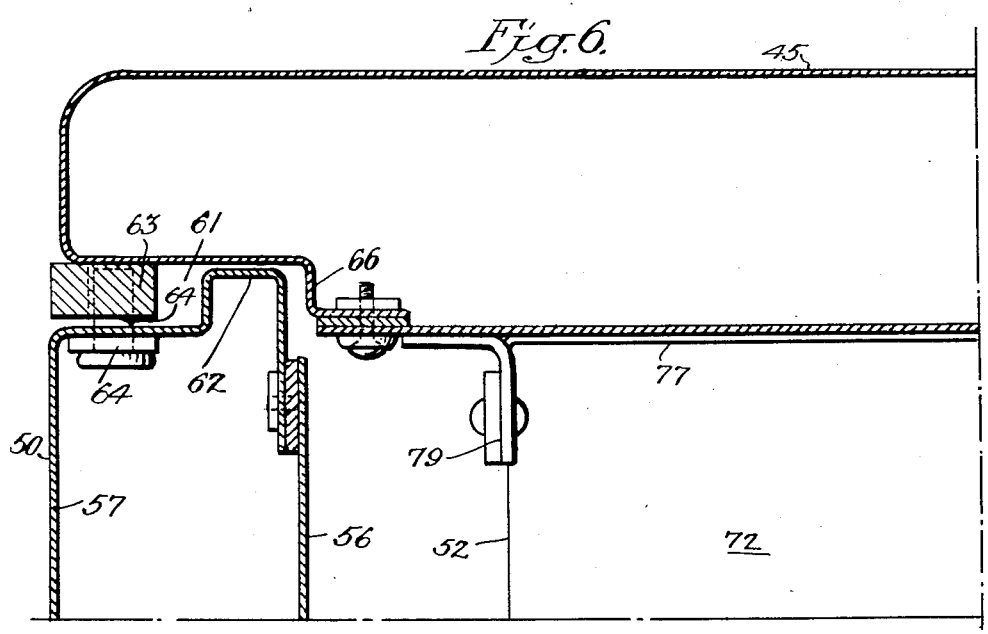
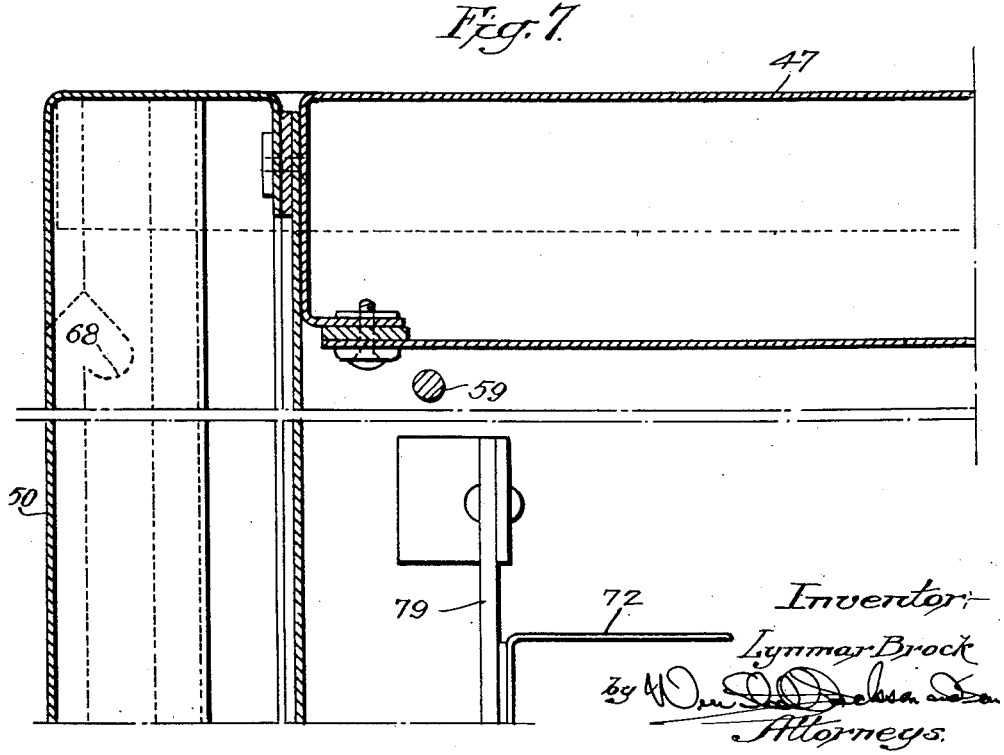

May 8, 1951 L. BROCK 2,552,143
ELECTRIC OVEN
Filed March 24, 1947 6 Sheets-Sheet 5

Inventor
Lynmar Brock
by [signature]
Attorneys.

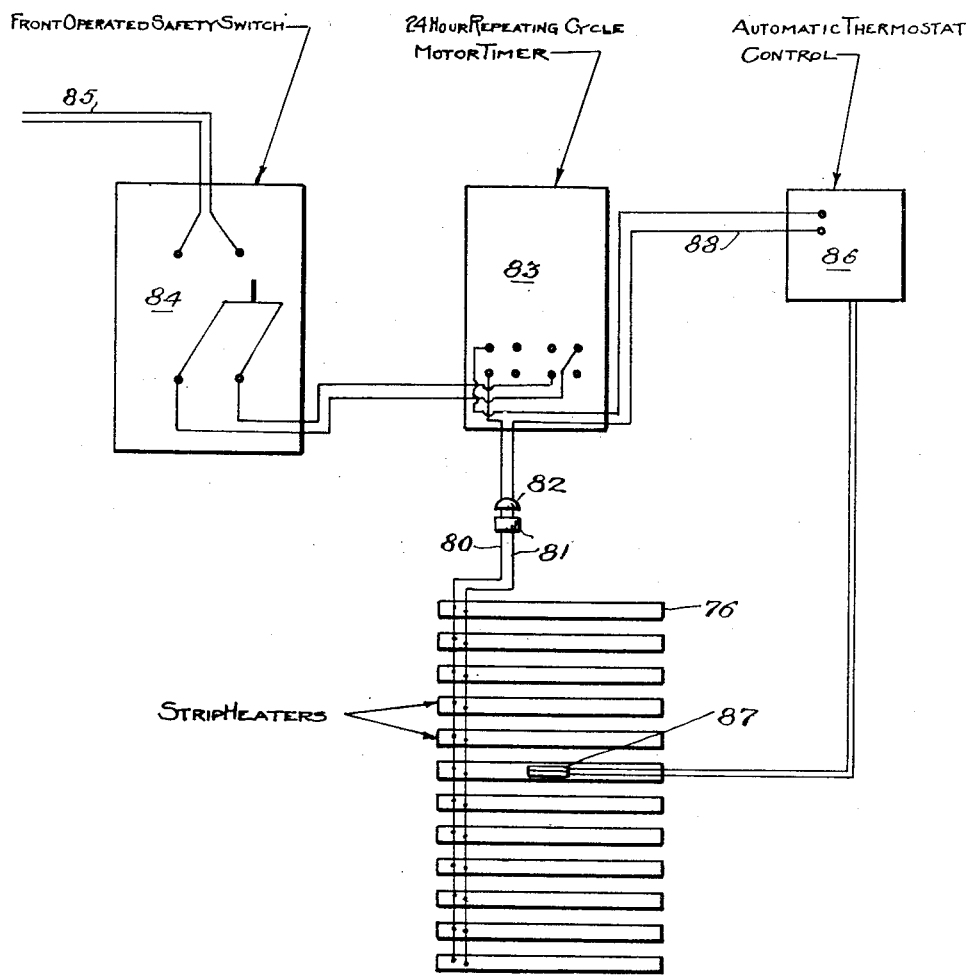

Patented May 8, 1951

2,552,143

UNITED STATES PATENT OFFICE 2,552,143

ELECTRIC OVEN

Lynmar Brock, Philadelphia, Pa.

Application March 24, 1947, Serial No. 736,859

1 Claim. (Cl. 219—35)

My invention relates to heaters used in preparing and dispensing food.

A purpose of my invention is to partially cook food, terminating such cooking at a definite point before completion, to distribute the partially cooked food on platters or the like in individual servings of a course of a meal, to deep freeze the food on such platters, to heat up and finally cook the food on the platters normally at the point of serving, preferably under time cycle control, and to serve the platter thus prepared and heated.

A further purpose is to preliminarily prepare food, refrigerate the same, partially cook the foods, distribute the partially cooked food on platters in individual servings for a course of a meal, deep freeze the food on such platters, transport them to a point where they are to be served, heat up and finally cook the food on the platters at the point of serving, and serve the heated food on the platters.

A further purpose is to cook food of various kinds to an extent which is incomplete by the same time interval for the various foods, distribute the various foods in individual unit servings for a course, transport such unit servings to the point of serving, heat up and complete the cooking of such unit servings under time cycle control and serve such heated unit servings.

A further purpose in an oven for heating food is to employ a bank of shelves vertically above one another with electrically heating elements built into each shelf and passages for air circulation in front and in back of the bank of shelves.

A further purpose is to build electric resistance heaters in each shelf of an oven and extending longitudinally of the shelves and provide heat insulation on the bottom of each shelf so as to encourage heat distribution upward from the shelves to the platters resting thereon.

In the drawings I have chosen to illustrate one form only which my invention may assume with slight modifications, the form being chosen as a convenient means of illustration.

Figure 1 is a front elevation of the oven of the present invention.

Figure 2 is a right end elevation of Figure 1.

Figure 3 is a section of Figure 1 on line 3—3.

Figure 6 is an enlarged horizontal section corresponding to Figure 5 but showing additional details.

Figure 7 is an enlarged vertical section of the oven showing a top portion.

Figure 9 is a diagrammatic view showing the electrical system used in my invention.

Figures 4, 5:
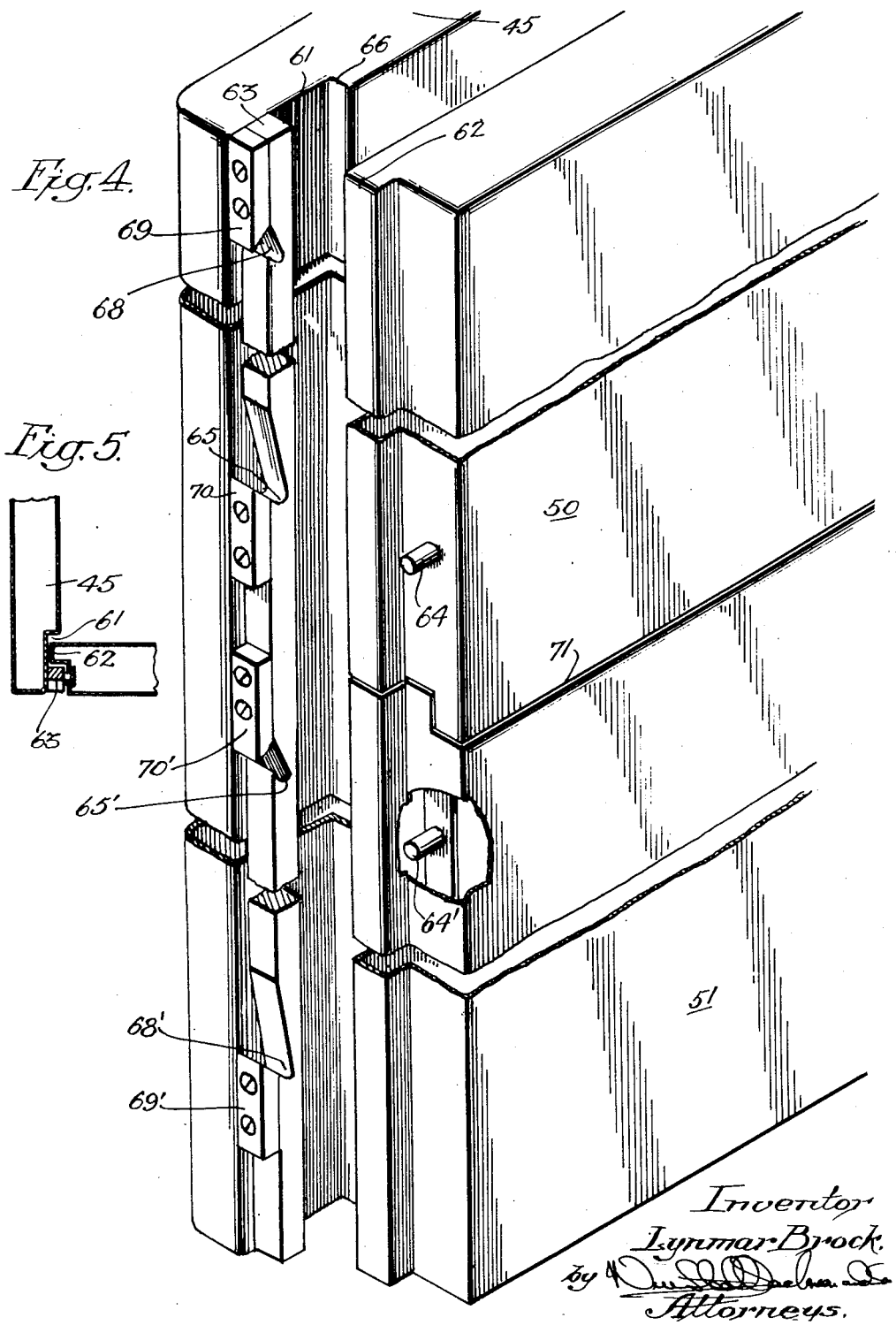
Figure 4 is an enlarged perspective view showing door guideways and slots with the door rotated 90° so that its end is visible in the same plane as the guideway inside at right angles.
Figure 5 is a fragmentary horizontal section through the oven at a corner where the door is attached.

Describing in illustration but not in limitation and referring to the drawings:

Particularly in connection with industrial plants, a serious problem is presented in serving hot food of high quality. Many plants are not of suitable size or layout to make operation of a conventional restaurant practical. In other cases the locations at which food service is desirable are so numerous that transportion of food from a central kitchen and maintaining of food in a palatable condition presents serious difficulties.

This application is a division of Serial No. 642,455, filed January 21, 1946, for Process and Apparatus for Preparing and Dispensing Food. The oven door subject matter has been divided and is contained in my application Serial No. 792,803, filed December 19, 1947, for Oven.

In accordance with the invention described in my co-pending application noted above, the food is partially cooked by conventional methods at a kitchen and then served in individual packages such as platters or the like, in individual servings of the various foods making up the course (in some cases the meal may have only one course) and finally distributed on the platters to the point of serving and there heated up and finally cooked.

The food in the first instance will be received and prepared. It then can be refrigerated prior to partial cooking although this step may in some cases be omitted. The prepared food will next be cooked to a partial extent. By this it is meant that a batch of vegetables will be cooked together, under the conditions suitable for cooking vegetables, whereas a cut of meat will be cooked independently under conditions for cooking meat. The same will apply to the other components of the meal.

The partial cooking will be carefully regulated so that the subject matter is not completely cooked. Usually the cooking will be incomplete by a time interval which is the same for all foods on a particular platter. For example, if the final increment of heating and cooking is to involve a thawing out and warm up period of 15 minutes and a cooking period of 15 minutes, the cooking of each of the items of food on the platter during the preliminary cooking stage will terminate 15 minutes before the food is done.

In choosing the relation between the preliminary cooking and the final cooking of food in the platter, it has been found that most satisfactory results from the standpoint of palatability of the food are obtained when the initial cooking accomplishes approximately 80 per cent of the complete cooking requirement. However, obviously this will not be the same in the case of all foods, since in the case of meats the initial cooking will probably be a fairly large proportion of the total cooking required, whereas in the case of vegetables the initial cooking may be a somewhat smaller proportion.

After the initial cooking, the food is served in individual servings on platters or in containers of other suitable type. Thus if the course is to consist of a meat and two vegetables, each platter will receive at this stage an individual serving of partially cooked meat and individual servings of two partially cooked vegetables. Other combinations may of course be employed.

Subsequent to the partial cooking, the food is deep frozen in the preferred embodiment. This deep freezing step has been found to be important in preserving the taste of the food. The preferred temperature is −10° F. to −20° F. although in some cases at this point temperatures 40° F. to −10° F. are used. Subsequent to or as part of the deep freezing stage, the individual food servings, desirably placed in transportation containers, will be transported, normally under refrigeration.

The food will be taken out of refrigeration at the point of serving and placed in a heated cabinet or oven for final cooking. This final cooking will accomplish the function of thawing and heating up the food, and then afterward adding the additional cooking increment which was deliberately omitted during the original partial cooking. It has been found that the product is vastly superior from the standpoint of taste when a final cooking increment is accomplished immediately before serving, as compared with food which has merely been warmed up after complete cooking.

In order to eliminate the human error and assure satisfactory control, the final cooking is accomplished under automatic control of a time cycle device which turns on the electric heating of the oven automatically at a proper time interval before serving to allow for the final cooking increment, as well as the heating up, and which turns off the electric heating automatically at the time of serving.

After the final cooking stage is completed, the food is removed from the cabinet or oven at the point of serving and dispensed to the users.

It will be evident that where in a large industrial plant or other establishment it is desired to serve lunches at several buildings, a final cooking oven will be located at each point of serving and will automatically heat up at the proper time with respect to the final cooking interval.

Figure 8:
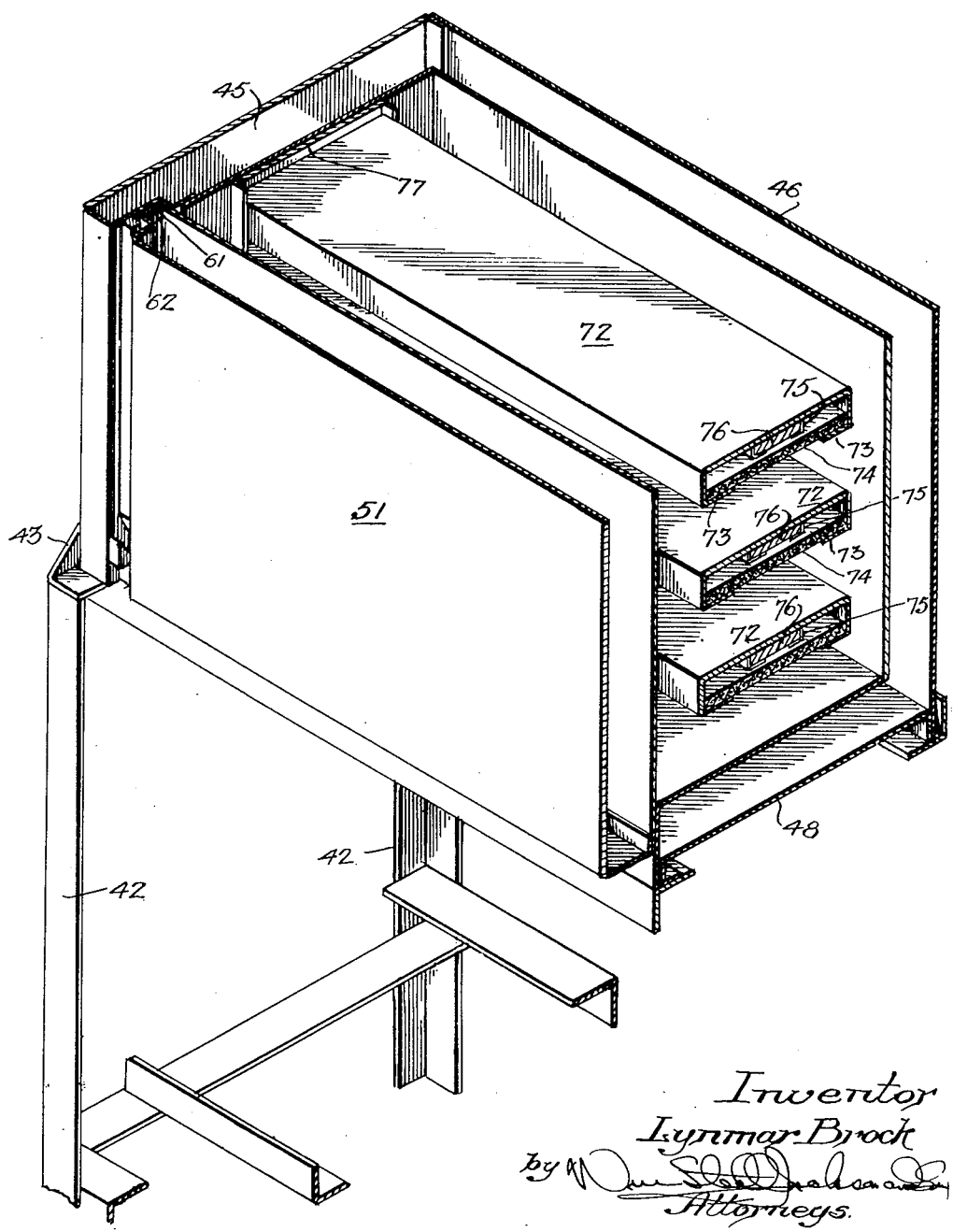
Figure 8 is a sectional perspective of the oven illustrating the arrangement of the shelves.

The oven for heating up and finally cooking the food as shown in Figures 1 to 8 consists of a support 42 of suitable structural shapes having a retaining rim 43 which receives and supports an oven chamber 44 consisting of side walls 45, rear wall 46, a top 47, a bottom 48, and a door 49 consisting of an upper section 50 and a lower section 51. Within the oven chamber 44, a tier of shelves 52 is arranged vertically above one another, with a front air passage 53, a rear air passage 54 and a top air chamber 55.

The walls and doors consist of inner portions 56, outer portions 57 and heat insulation 58 between the outer and inner portions.

In order to secure the walls against buckling, a tension rod 59 (Figure 1) is tightened by a turnbuckle 60.

The open positions of the doors are shown in dot and dash in Figure 3.

The door structure includes guideways 61 in the side walls which receive guiding ribs 62 on the ends of each door section. The front edge of each guideway 61 is limited by strips 63 which provide pin and notch support for the door sections in their respective positions. For example, the pins 64 on the upper door section 50 engage in notches 65 when the door section is down or closed, the door section resting well back with the rib 62 against the rearward edge 66 of the guideway. For purposes of opening, the door section is simply grasped by the handle 67 and pulled upward and slightly forward so that the pins 64 leave the slots 65 and move up to and engage in the slots 68. As the pins seat in the slots 68, the door section again moves back, bringing the ribs 62 against the rearward edges 66 of the guideways 61. The limiting positions at the upward and downward extremes of movement of the door section 50 are provided by removable stops 69 and 70 which engage the pins 64 to prevent them from moving beyond the limits of slots 65 and 68. The guideways 61 prevent the pins from coming far enough forward to miss the stops 69 and 70.

The door section 50 meets another door section 51 at the interlocking seal line 71, the lower section moving downward to open in the same way that the upper section moves upward to open. Thus the pins 64' engage in slots 65' when the door is closed, but to open the door the pins are removed from the slot 65' and placed in the slots 68'. The stops 69' and 70' limit the door movement.

The shelves consist of shelf bodies 72 bent to form inwardly extending U-ribs 73 below the top of each shelf. Insulation material 74 is placed on the ribs to minimize transmission of heat downward and tend to concentrate heat in the upper surface of the metallic shelf and the platters resting on it. Brackets 75 suitably attached as by welding to the shelf bodies immediately under the top and above the insulation 74 receive strip or other heaters 76, suitably electric resistance heaters. The heaters 76 will be insulated from the brackets and the shelves.

The individual shelves, the heaters in the shelves and the insulation on the lower surfaces of the shelves provide units which are united together into a shelf section by supports 77 adjoining the side walls. The shelf section is removably secured at the bottom by stops 78 which make tongue and slot connection with the shelf section and are locked at the top by suitable pivoted latches 79.

The electrical circuit is indicated in Figure 9, where the shelf heaters 76, having interior resistance wiring not shown, are connected by leads 80 and 81 through plug connections 82 from a 24 hour repeating cycle motor timer 83 connected through a safety switch 84 to a power source at 85. The temperature of the shelf heaters is thermostatically controlled by an automatic controller 86 having a temperature responsive element 87 in the oven, and wired into the circuit at 88.

In operation, the food after preparing, refrigerating and partial cooking, will be placed in containers and deep frozen and stored, then transported under refrigeration to the point of serving, where it will be placed in the oven. The oven is desirably dimensioned so that 3 or 4 platters will fit on each shelf. The oven doors are then closed and the personnel concern themselves with other duties during the period prior to serving, since the motor timer will automatically turn on the shelf heaters to start the oven, and turn off the heaters to stop the oven at predetermined times which will provide for heating up the food completion of the previously incomplete cooking in the oven. During operation of the oven the temperature is controlled by the automatic controller so that the food is completely cooked, hot and ready to serve at the predetermined time.

In view of my invention and disclosure variations and modifications to meet individual whim or particular need will doubtless become evident to others skilled in the art, to obtain all or part of the benefits of my invention without copying apparatus shown, and I, therefore, claim all such insofar as they fall within the reasonable spirit and scope of my claim.

Having thus described my invention what I claim as new and desire to secure by Letters Patent is:

In an oven, a plurality of metallic shelves in a vertical bank, each extending longitudinally from end to end of the oven and each of inverted channel cross section with open arms of the channel at the bottom, an electric resistance heater extending longitudinally inside the channel of each shelf, heat insulation below the electric resistance heater inside the channel of each shelf and air circulation passages in front and in back of the bank of shelves.

LYNMAR BROCK.

REFERENCES CITED

The following references are of record in the file of this patent:

UNITED STATES PATENTS

| Number | Name | Date |
|---|---|---|
| 358,085 | Sumerwell | Feb. 22, 1887 |
| 1,113,487 | Rose | Oct. 13, 1914 |
| 1,307,483 | Coleman | June 24, 1919 |
| 1,406,372 | Grapp | Feb. 14, 1922 |
| 1,637,427 | Riches et al. | Aug. 2, 1927 |
| 1,893,694 | Bohmker | Jan. 10, 1933 |
| 2,180,797 | Cockerham | Nov. 21, 1939 |
| 2,184,685 | Brace | Dec. 26, 1939 |
| 2,314,592 | McCormick | Mar. 23, 1943 |
| 2,330,728 | Mayer | Sept. 28, 1943 |